United States Patent [19]

Oppl et al.

[11] 4,249,881
[45] Feb. 10, 1981

[54] STATION FOR RUNNING FOAM-PLASTICS MATERIAL INTO SHUT MOLDS

[75] Inventors: Othmar Oppl, Hergensweiler; Hermann-Siegfried Jaeger, Lindau, both of Fed. Rep. of Germany

[73] Assignee: Admiral Maschinenfabrik GmbH, Lindau, Fed. Rep. of Germany

[21] Appl. No.: 67,765

[22] Filed: Aug. 20, 1979

[30] Foreign Application Priority Data

Aug. 31, 1978 [DE] Fed. Rep. of Germany ....... 2838079

[51] Int. Cl.³ ............................................. B29D 27/04
[52] U.S. Cl. ....................................... 425/543; 264/51; 264/328.1; 264/DIG. 83; 425/575; 425/259; 425/817 R
[58] Field of Search ........... 425/4 R, 258, 149, 817 R, 425/145, 543, 575, 259; 264/328, DIG. 83, 51

[56] References Cited

U.S. PATENT DOCUMENTS

| | | | |
|---|---|---|---|
| 3,574,888 | 4/1971 | Holaday | 425/4 R X |
| 3,599,282 | 8/1971 | Meyers et al. | 425/817 R X |
| 3,621,522 | 11/1971 | Woodhall | 425/817 R X |
| 3,745,203 | 7/1973 | Harper | 264/DIG. 83 |
| 3,771,928 | 11/1973 | Gostyn et al. | 264/DIG. 83 |
| 3,871,801 | 3/1975 | Buchmann | 425/258 X |
| 4,017,234 | 4/1977 | Andrews et al. | 425/258 X |
| 4,075,301 | 2/1978 | Oswald | 425/145 X |
| 4,102,367 | 7/1978 | Shulman et al. | 425/258 X |
| 4,150,074 | 4/1979 | Tilgner | 264/DIG. 83 |

*Primary Examiner*—Philip Anderson
*Attorney, Agent, or Firm*—St. Onge, Mayers, Steward & Reens

[57] ABSTRACT

A station for running foam-plastics material into shut molds has a mixing head with first and second driving systems, the one for moving the mixing head sideways to an inlet opening of each mold, and the other for moving the mixing head downwards into and upwards out of the inlet opening. The mixing head and the first driving system together with the second driving system are supported by a slide or carriage, which is guided along a section of the transport way of the smoothly moving molds. By way of a driving connection, the slide may be joined up with the mold which is to take up the plastics material and cleared from it again when the mold is full.

7 Claims, 3 Drawing Figures

STATION FOR RUNNING FOAM-PLASTICS MATERIAL INTO SHUT MOLDS

BACKGROUND OF THE INVENTION (i) Field of the Invention

The invention is in respect of a station for running foam-plastics material into shut molds, having a mixing head, a first driving system for moving the mixing head to the inlet opening of the mold in question into which plastics material is to be placed, and a second driving system for moving the mixing head into, and out of, the inlet opening. In the present invention the wording "foam-plastics" or "foam-plastics material" is used to have the sense of material designed for making foamed workpieces.

(ii) The Prior Art

In the case of prior filling station design the molds have to be stopped for movement of the mixing head to the inlet opening and for inlet of the plastics material into the inside of the mold. In the case of a production line having a number of mold carriages hanging from an endless transporter chain, such a stop-go operation of the system makes necessary the use of a driving motor with a high power, and a high level of power use making for heavy wear of the plant, because all mold carriages have to be stopped at certain times and then speeded up again. So far, however, this shortcoming has not been generally of much weight, because the use of shut molds has only been necessary in special cases; in fact, currently, most workpieces made of foam-plastics material on a mass scale are produced by the steps of: firstly causing distribution of the plastics material in the mold while still open, something which is readily possible even if the molds are moved without stopping, and then, only later, shutting the mold for foaming of the material. Presently, however, use is being made to an ever increasing degree of quick-foaming plastics materials for manufacture on a mass scale as well, such plastics materials expanding upwards to the parting line of the mold before the mold may be shut. In such cases, loss of material from the mold is likely, this being a shortcoming not only with respect to the quality of the work, but furthermore in respect to keeping the plant clean and in running order. So, in view of the currently marketed foam-plastics materials, which have to be processed at high speed, it is necessary for the mold to be shut when the plastics is run into it in many cases in which, earlier, the process was undertaken with the mold open.

SUMMARY OF THE INVENTION

For these reasons one purpose of the present invention is that of making such a further development of a mold station as defined hereinafter such that it may be used for running foam-plastics material into smoothly, that is to say continuously, moving molds.

This and other purposes are effected in the case of such a plastics run-in or filling station by the use of the measures that the mixing head and the first driving system and furthermore the second driving system are supported by a carriage, which is guided along a section of the transport way of the smoothly moved molds parallel thereto and by way of a driving connection, able to be engaged with and disengaged from the mold which is to take up the plastics material.

In the plastics run-in station of the invention, the mixing head is moved truly in step with the mold even with small changes in mold speed. Such changes in speed may be produced, for example, by voltage changes in the public electricity line from which the electric drive motor of the transporter of the production line is powered, or by the great size of the links of chains of the transporter or conveyor running over chain-driving and guide wheels. In the case of the mold station, on the other hand, of the invention, no complex mechanical or electronic measures have to be taken to make certain of this fully instep operation.

Useful further developments of the invention are made clear in the following description and claims.

A preferred embodiment of the invention makes it possible for the motion of the mixing head across the transport direction of the molds and the joining up and undoing of the driving connection to be effected in fact by a single driving cylinder. For this reason, the further masses to be moved in addition in the station carriage and mixing head are kept small, something which has a useful effect with respect to producing even running at an even speed of the transporter for the mold. Furthermore, a further drive for eturing the carriage and the mixing head into the starting position only has to be of a small size, and furthermore, the backward motion of the carriage and the mixing head into the starting position takes place at a high speed because of their very small weight. Lastly, the station is specially simple in design and structure, something keeping down the price of the plant in the first place and furthermore decreasing the amount of work later for keeping it in good runnung order.

By provision of a further embodiment of the invention, there is the useful effect that the foaming of the plastics material may take place in a sloping or inclined mold, so that it is readily possible for venting of the mold to to take place. The mixing head may take part in this tilting motion of the mold, so that, if necessary, further foam-plastics material, may be run into the mold while inclined.

The further development of the invention makes certain that the mixing head is fully registered with the inlet opening of a mold to be filled, even if the mold is not exactly at the best possible position when filling commences. Furthermore, in this respect, it is not necessary to make use of complex electronic control systems for moving the mixing head to the inlet opening.

By a provision of the invention, it is possible to make certain that, starting with the mixing head carriage in the starting position, firstly the support levers are lowered, while the position of the mixing slide in relation to the guide supporting it is kept until the supporting levers have gone into their fully lowered position, and it is only then that the mixing head slide is moved sideways over the mold until its outlet or discharge nozzle is lined up with the mold's inlet opening. The other way round, on moving the parts back into the starting position, one may be certain with this system that firstly the mixing head slide is moved inward as far as it will go and it is only then that the supporting levers, together with the mixing head and slide, are lifted.

The further development of the invention disclosed herein, is useful in that it is responsible for a mold filling station design needing little space. It is furthermore responsible for a specially trouble-free supporting arrangement of the mixing head in the working position.

In the mold station a further driving system is made to run at a very much greater return speed than the speed of the transporter for the molds, so that the carriage, supporting the mixing head and its driving systems, may be returned quickly into its starting position, in which it is then ready for running plastics material into the next mold.

BRIEF DESCRIPTION OF THE DRAWINGS

An account will now be given of the invention making use of one working example, which will be seen in the accompanying figures.

DETAILED DESCRIPTION OF THE PREFERRED EMBODIMENTS

Figure 1:
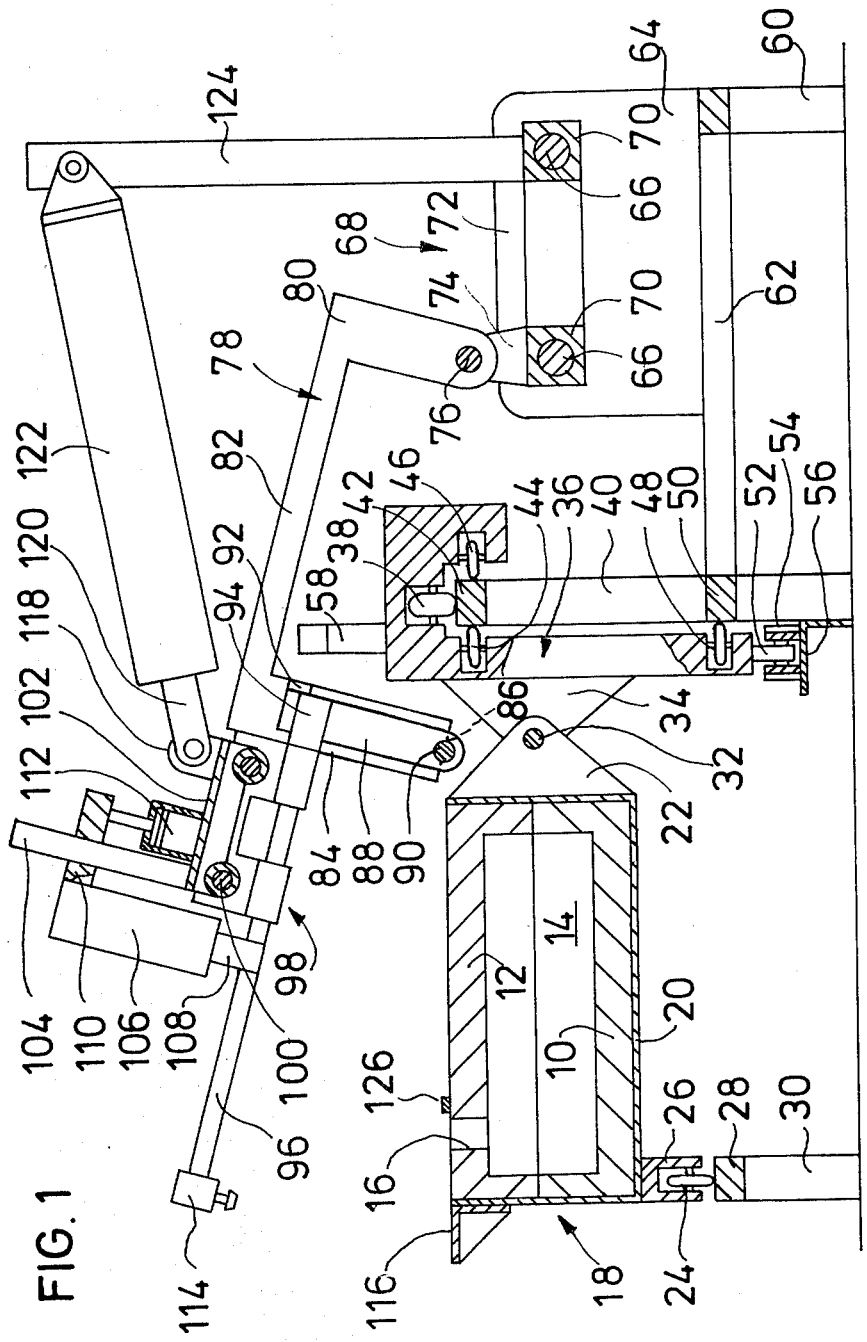
FIG. 1 is a section through a station for running foam plastics material into shut molds, the section taken being normal to the transport direction of the molds, showing the parts in that position which they assume before plastics material is run into the mold.

FIG. 1 is a section, extending transversely of the direction of mold travel, through a station for running foam-plastics material into molds for making molded foam workpieces, as for example seat parts for motor-vehicles. The station is placed at one point in a loop-like transport or conveyor way of a production line, not shown in the drawings, for foamed plastics workpieces. The production line will furthermore have a station for heating up and curing the plastics material and a station for opening the molds, taking out the completed foamed plastics workpieces and for shutting the molds again.

As will be clearly seen from FIG. 1, the molds are made up in each case of a lower half 10 and a top mold half 12, defining a mold recess or cavity 14 between them. The top mold half 12 has an inlet opening 16 able to be shut by a stopper, which is not shown in the figures.

The mold halves 10 and 12 are placed on a mold transport 18, which has a mold case 20, on one of whose longer sides two spaced wings 22 are placed at whose lower side a support wheel 24 is journalled in position by a bearing block 26. The support wheel 24 is designed for running on a rail 28 resting on support 30. The support wings 22 are joined by way of a axle 32 with wings 34 on trolley structures 36.

These trolley structures 36 each have a support wheel 38, running on a rail 42 carried by supports 40, and two top guide wheels 44 and 46, running on the side faces of the rail 42, and a lower support wheel 48 keeping the trolley structure from being turned about an axis normal to the plane of the drawing. This support wheel 48 is designed to run on a lower rail 50, which, as well, is placed on the supports 40. At the lower end of the trolley structure 36 there is, furthermore, a driving pin 52 running into a transport chain 54, the chain 54 being supported on the top side of an angle iron 56 fixed to the supports 40. At the top side of the trolley structure 36 there is, furthermore, a nosepiece or arm 58, projecting upwardly, and used as a driving part.

The frame of the mold station incorporates rear supports 60 which help to carry horizontal supports 62, the latter being used for supporting two wing plates 64, spaced in the direction of transport. Between the wing plates 64 there are placed two parallel guide bars 66, on which a filling station carriage, generally numbered 68, may be moved in the direction parallel to the transport direction of the mold transport 18. Guide bushings 70 (encircling bars 66) of the carriage 68 are, in each case, joined together by horizontal cross-bars 72, which, at the ends nearest to the mold carriage 18, have eyepieces 74 in which a bearing shaft 76 is fixed. The bearing shaft 76 has two downwardly open, U-like support levers 78, with a bearing arm 80, a middle lever section 82, able to be moved into the way of the nosepiece 58 and otherwise clear of the trolley structure 36 on the rail 42, and a lever section 84 running downwards again. The lever section 84 has a semicylindrical bearing part 86, with which it may be seated on the axle 32, with axle 90 and axle 32 aligned.

The levers 88 are rotatable about axle 90 on the lever section 84 and kept by stops 92 in the position to be seen in the figure when the support levers 78 are lifted. On the levers 88 seating blocks or abutments 94 are fixed for guide rods 96 running in the sideways direction, that is to say parallel to the plane of the figure.

On the guide rods 96 a mixing head slide 98 may be moved, which is designed as a two-motion slide with guide rods 100 running parallel to the transport direction of the molds and transports. On the guide rods 100 a table 102 is supported which has a guide post 104 for a mixing head 106, not here seen in full detail. The mixing head 106 has an outlet or pour nozzle 108 able to be run into the inlet opening 16 of the mold. On guide plate 110 of the mixing head, one end of a double-acting piston assembly 112 is attached while the other end is fixed to the table 102 and is used for lifting and lowering the mixing head 106. At the free end of the guide rods 96 a limiter 114 is fixed in position for coming up against an angle part 116 of the mold transport 18, and running out from the side of it.

On the table 102 of the mixing head slide 98 there is, furthermore, an eyepiece 118 providing pivotal connection with the piston rod 120 of a reciprocable actuator or driving cylinder 122, which is pivotally joined with the top end of an upright post 124, supported by the carriage 68.

Figure 3:
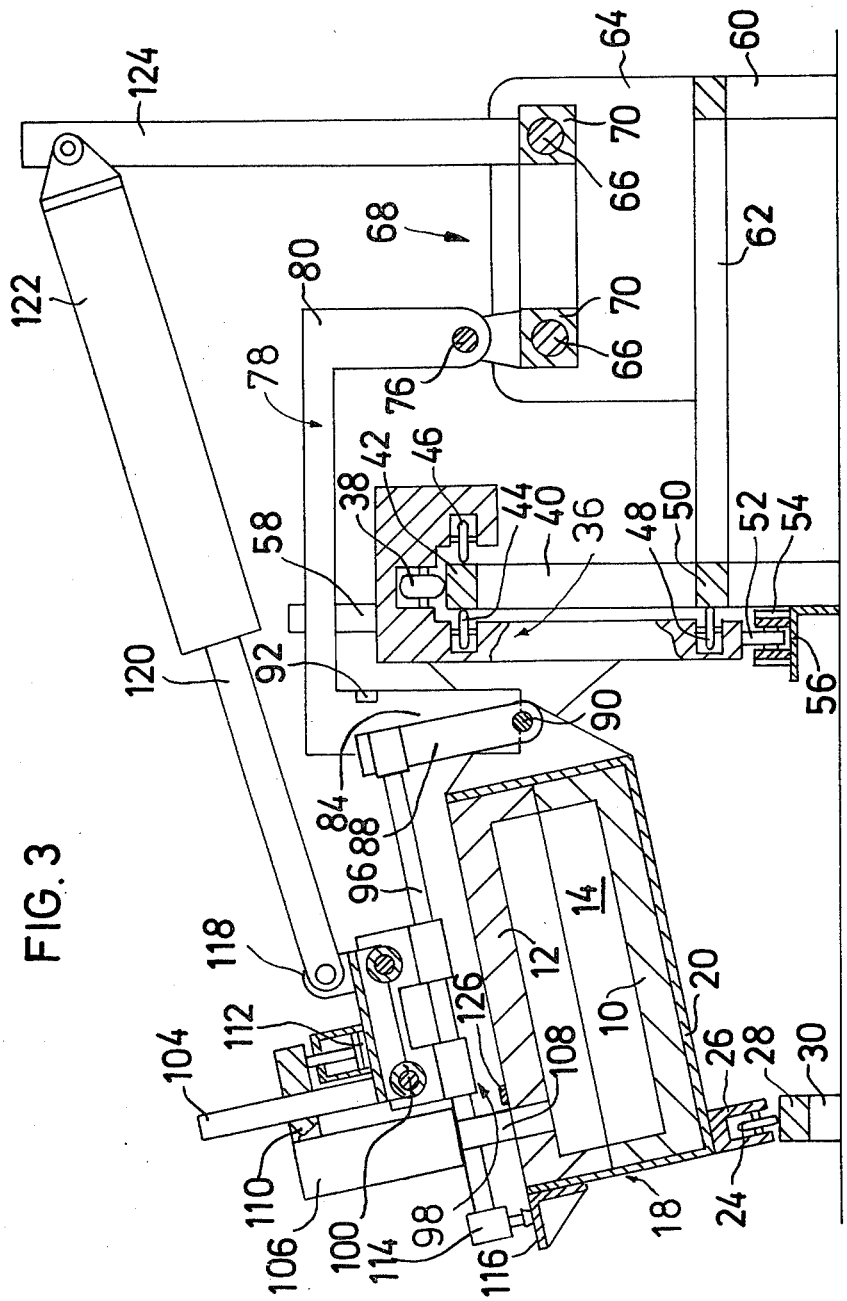
FIG. 3 is a section like that of FIGS. 1 and 2 in which, however, the mold and the mixing head are furthermore shown inclined.

For positioning the mixing head 106 along guide rods 96, the top mold half 12 has a stop 126, against which the mixing head slide 98 comes to rest. This occurs after the guide rods 96 have been lowered by cylinder 122 to make contact of limiter 114 with the mold, which latter may be horizontal or sloping (see FIG. 3).

An account will now be given of the operation of the station for running foam-plastics material into continuously moving molds in a shut condition.

Figure 2:
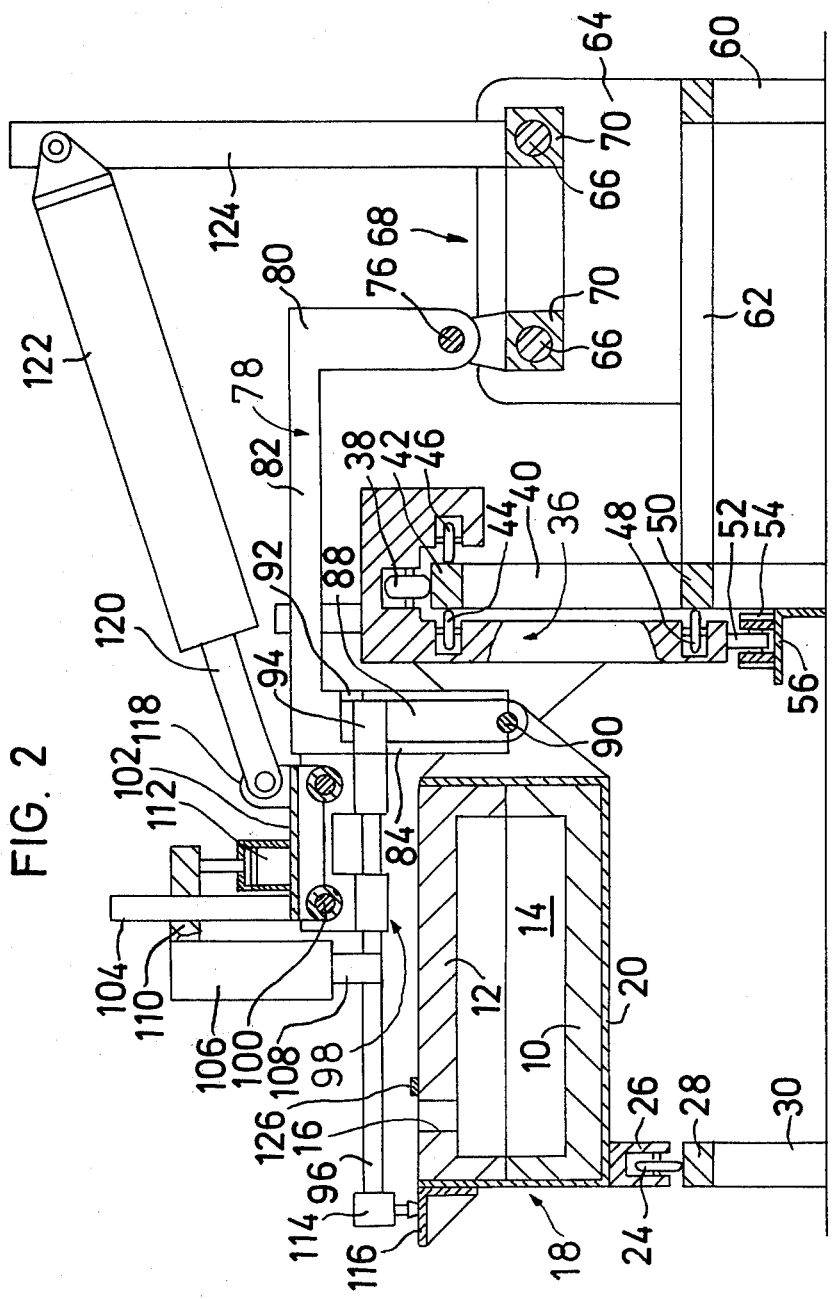
FIG. 2 is a section like of FIG. 1, but in which, however, the mixing head support has been lowered and is shown mechanically joined up with one mold.

When a mold 10,12 in a shut condition, without any plastics material in it, comes to the station, a feeler or similar detector means (not shown in the drawings) is activated to initiate the operation of the driving cylinder 122 by pressure medium (e.g., hydraulic or pneumatic) so that the support levers 78 are turned downwards about axle 76. The feeler or detector means may function magnetically or photoelectrically. On operation of the cylinder 122 furthermore the mixing head slide 98, supported by support bars 96, is lowered until the semicylindrical bearing part of the lever section 84 comes to rest on the axle 32. At the same time the limiter 114 comes up against the angle part 116 so that the lever section 82 is now in the way of the nosepiece 58 and is engaged and pushed along by it. This condition is to be seen in FIGS. 2 and 3. At this point in time the motion of the mold transport 18 and the motion of the mixing head 106 parallel to the transport direction are locked in step.

As the driving cylinder 122 is further acted upon by pressure and its piston rod is pushed further outwards to the left, the mixing head slide 98 is moved along the guide rod 96, to the left as seen in the figure, until its outer face, comes up against the stop 126. Now the outlet 108 of the mixing head 106 is in line with the inlet opening 16 of the mold and, because driving fluid is run into the top space i.e., above the piston, as seen in the figure, of of double-acting piston 112 the outlet end 108 of the mixing head 106 is moved into the inlet opening 16. Now foam-plastics material is run in a normal way out of the mixing head 106 into the mold, which, as has been said earlier, is horizontal or sloping. If the mold is sloping (see FIG. 3), the mold carriage 18 will be located on a section which has the rail 28 at a somewhat lower level than in FIG. 1. In this case the mold carriage 18 is tilted under its own weight about the axle 32. The outcome of this positioning of the mold is that gas will vent from the gas space at the top right within the mold, as plastics material is run into the mold, between the parting faces of the two mold halves 12 and 14 or by way of a small gas outlet hole, while the level of foam-plastics in the mold cavity 14 is rising. This tilting motion of the mold carriage is allowed to take place by the guide rods 96, as the levers 88 may pivot about the axle 90. Hydraulic actuator 122, still acted upon by pressure forcing it in the outer direction, takes part in the pivoting motion as well.

After the full amount of foam-plastics material has been run into the mold, the lower working space of the double-acting piston 112 is acted upon by pressure and the outlet 108 of the mixing head 106 is thus pulled clear of the inlet opening 16. Then the actuator 122 is acted upon by pressure for pulling in its piston rod, so that the mixing head slide 98 is moved to the right on the guide rods 96 until its inner end face, which is open on the right in the figure, comes up against the seating blocks 94. The inlet opening 16 may then be stoppered once the mixing head 106 has been cleared from it. As the actuator piston rod 120 is moved further inwards, the guide rods 96, together with the levers 88 on axle 90 are pivoted upwards as far as the stop 92 and then, on further inward motion of the piston of the driving cylinder 122, the support levers 78 are lifted upwards as well so that the middle lever section 82 is moved clear of nosepiece 58. The nosepiece 58 may furthermore be moved by a cam unit, not seen in the drawing but fixed to the frame, out of the way of pivoting of the lever section 82. When the mixing head 106 and the support levers 78, together with the other parts of the filling station, have been moved into the angle positions to be seen in FIG. 1, a further driving system, not seen in detail in the drawings, is used for moving the carriage 68 along the guide rods 66 oppositely to the transport direction of the molds, back to its starting position, ready for running plastics material into the mold of the next mold transport.

For molds of very great size, it may be necessary for the mold cavity to have the plastics material run into it through a number of spaced fill or inlet openings. For moving from one of a number of inlet openings to an other, placed one after the other on a line running in the cross-direction, that is to say parallel to the plane of the paper, it is then possible to make use not of the stop 126, but of a cam shaft, which has cam faces at different angles of turning in line with the different positions along the cross-ways line. For aligning the pour nozzle 108 with different inlet openings, spaced in the direction of transport, that is to say normal to the plane of the figure, it is possible to make use of a further driving cylinder for moving the table 102 on the guide rods 100, so that in this case the stopping of the table at one or other of the inlet openings may be produced by a stop or making use of a cam shaft again.

It will be seen from the account given of the plastics run-in station that for functionally coordinating the mixing head and the mold transport, for making quite certain that they are moved in step, for moving the mixing head in the crossways direction and for tilting of the mixing head in addition—this being necessary on work with tilted molds—only a single driving cylinder is necessary. This is not only advantageous in reducing equipment costs, without sacrificing reliability and maintenance-free operation, but the invention furthermore has the advantage of reducing the weight of the parts which have to be moved in cooperation with the continuously moving mold transports. This is because on the one hand, the driving motor of the transporter of the production line is not heavily loaded on initiating motion of the mixing head, so that there is no sharp pulling effect produced in the transporter chain: and because, on the other hand, the further driving system, responsible for moving the mixing head back into the starting position, may be made small in design. Moreover a very useful effect is produced because all motion of the mixing head takes place at a very high speed, because of the small weight of the parts to be moved.

We claim:

1. Apparatus for feeding a foamable plastic mix into successively advancing shut molds having filling apertures, wherein said molds are advanced along a predetermined line of travel by mold transports forming part of a conveyor system, said apparatus comprising
   a mixing head carriage reciprocable in a direction parallel to the line of travel of the molds;
   support means mounted on said carriage and pivotable between raised and lowered positions relative to said molds and transports;
   first means operatively associated with each mold and mold transport adapted to engage said support means in the lowered position thereof whereby said carriage is advanced with said transport;
   guide means, and a mixing head slidably mounted thereon, said guide means being secured to said support means and extending over the molds and transports transversely of their direction of travel, said mixing head being reciprocable on said guide means between inner and outer positions;
   second means on said guide means defining said inner position of said mixing head and other means operatively associated with each mold and transport defining said outer position of said head on said guide means, said mixing head having an outlet which registers with a filling aperture of a mold when said mixing head is at said outer position;
   first actuator means providing axially reciprocable driving power connected between said mixing head and carriage, said actuating means moving said mixing head outwardly on said guide means with extension of said actuator means and conversely moving said mixing head inwardly toward said inner position during retraction, said actuator means further causing said support means to be pivoted to its raised position, disengaging said first means and interrupting further travel of said carriage with each said mold and transport, upon continued retraction of said actuator means after said mixing head reaches its said inner position.

2. Apparatus as defined in claim 9, wherein
said mold transport includes a mold carrying portion and a trolley portion pivotally connected thereto by an axle running parallel to the direction of travel, which axle allows the mold carrying portion to be inclined relative to the trolley portion for venting the mold, a pivotal mounting connecting said guide means to said support means to allow the guide means to pivot downwardly from an initial position into corresponding inclination with the downward tilting of a mold, said pivotal mounting for said guide means being located inwardly and downwardly of the connection of said first actuator means to said mixing head, and an abutment on said support means above its said pivoted mounting and engaged by said guide means for preventing the latter from pivoting upwardly relative to said support beyond said initial position.

3. Apparatus as defined in claim 2, wherein
said support means includes a bearing block at the point of pivotal connection of said guide means thereto, said bearing block making bearing contact with said axle connecting said mold carrying and trolley portions of said mold transport when said support means is in its lowered position, whereby to allow said guide means to pivot downwardly about said axle from said initial position and thereby conform to inclination of said mold carrying portion.

4. Apparatus as defined in claim 2, wherein
said support means pivotally mounted on said carriage is of U-shape and bridges over said trolley portion of said transport, said first means being fixed to said trolley portion in position to be engaged by said U-shaped support means only when the latter is in its lowered position.

5. Apparatus as defined in claim 1, wherein
said mixing head carriage incorporates a support to which one end of said actuator means is attached, the point of such attachment being located higher, in all positions of said actuator, than the point at which its opposite end is attached to said mixing head.

6. Apparatus as defined in claim 1, which further includes a slide on which said mixing head is mounted for reciprocation on said guide means between said inner and outer positions, said slide further including a table to which said mixing head is secured, and other guide means connecting said table to said slide and permitting reciprocation of said table relative to said slide along a direction parallel to the line of travel of the molds.

7. Apparatus as defined in claim 1, which further includes means for mounting said mixing head on said guide means for reciprocation toward and away from a mold filling aperture, and double-acting piston means connected between said mixing head and guide means for effecting such reciprocation.

* * * * *

UNITED STATES PATENT OFFICE
CERTIFICATE OF CORRECTION

Patent No. 4,249,881　　　　　　　　　Dated February 10, 1981

Inventor(s) Othmar Oppl and Hermann-Siegfried Jaeger

It is certified that error appears in the above-identified patent and that said Letters Patent are hereby corrected as shown below:

Column 7, claim 2, line 5 "Apparatus as defined in claim 9" should read --Apparatus as defined in claim 1--.

Signed and Sealed this

Twenty-sixth Day of May 1981

[SEAL]

Attest:

RENE D. TEGTMEYER

*Attesting Officer*　　　*Acting Commissioner of Patents and Trademarks*